Jan. 12, 1971 J. G. LOWE 3,554,583
COUPLER FOR SCAFFOLD TUBES
Filed Aug. 18, 1969 3 Sheets-Sheet 1
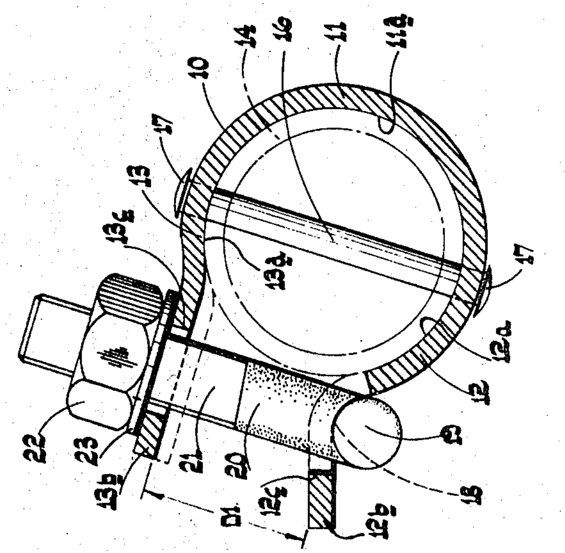
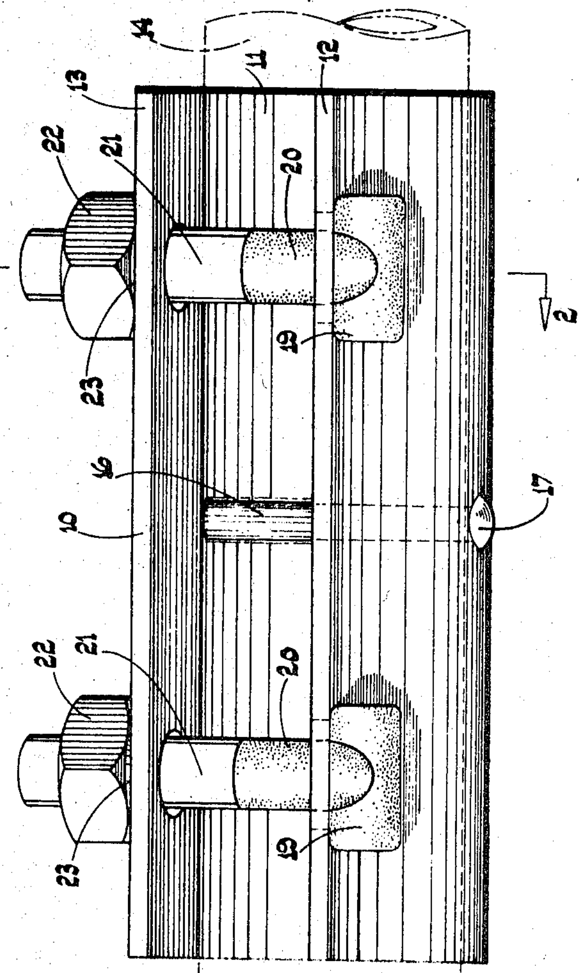

COUPLER FOR SCAFFOLD TUBES

Filed Aug. 18, 1969 3 Sheets-Sheet 2

COUPLER FOR SCAFFOLD TUBES

Filed Aug. 18, 1969

Inventor
Jack Graham Lowe

United States Patent Office 3,554,583 Patented Jan. 12, 1971

3,554,583

COUPLERS FOR SCAFFOLD TUBES

Jack G. Lowe, Belbroughton, England, assignor to Burton Delingpole & Company Limited, Warley, England, a British company Continuation-in-part of application Ser. No. 794,527, Jan. 28, 1969. This application Aug. 18, 1969, Ser. No. 850,985

Int. Cl. E04g 7/00

U.S. Cl. 287—53.5 3 Claims

ABSTRACT OF THE DISCLOSURE

This invention relates to couplers which secure a pair of scaffold tubes in end-to-end relationship in builders scaffolding and is concerned with couplers in which part of the coupler body is locally deformed so as to apply local clamping pressure to the scaffold tube when the coupler is tightened.

This invention relates to couplers for builders scaffolding which secure together in end-to-end relationship a pair of similarly cylindrical shaped scaffold tubes.

The present application is a continuation in part of my prior patent application Ser. No. 794,527, filed Jan. 28, 1969, now abandoned.

I have already experimentally manufactured in a non-public manner a coupler for the foregoing purpose embodying a resilient strip metal body comprising a part circular substantially C-shaped portion embodying a pair of arms each of part circular shape on the inner face thereof, each having an internal radius of curvature corresponding to the peripheral radius of curvature of each of the two scaffold tubes so as to be in close contact therewith over the entire length of each of the two arms, each of the two arms terminating in relatively diverging edge flanges, a pair of clamping bolts spaced relatively apart in a direction along the axis of curvature of the C-shaped body and extending each through a pair of holes formed in the arms at the junction between each of the two arms and their respective edge flanges, and being so disposed as being each adapted through the two arms to apply clamping pressure to the two scaffold tubes by pressing the two arms into pressure engagement with the two tubes. In such prior proposal the bolts were in pressure engagement with the two arms and with the two edge flanges at the end of the two opposite sides of each of the two openings through which each bolt extends. In consequence if more than a very small torque is applied to the bolts to tighten the same the coupling distorts so substantially as to become unsafe. Thus the friction grip which can usefully be applied by the coupling to the two tubes in this prior unpublished proposal of myself is severely restricted so that the ability of the coupler to connect together two scaffold tubes subjected to a tensile loading tending to pull them apart is very limited.

The present invention has for its object the provision of a scaffold tube coupler for the purpose above described which is considerably more effective than the prior proposal above-mentioned in securing two scaffold tubes in end-to-end relationship so as to preclude their separating apart from one another under tensile loading.

SUMMARY OF THE INVENTION

The present invention comprises builders scaffolding means connecting two similarly cylindrical shaped metal scaffold tubes in end-to-end relationship comprising a coupler embodying a body formed of spring steel strip of surface hardness greater than the surface hardness of the metal forming the two scaffold tubes, said body comprising a part circular substantially C-shaped portion embodying first and second arms each part circular shape on the inner face thereof, said arms each terminating in relatively diverging edge flanges, a pair of clamping bolts spaced relatively apart in a direction along the axis of curvature of the C-shaped body and extending each through a pair of holes formed in the arms at the junction between each of the two arms and their respective edge flanges, said first arm having an internal radius of curvature corresponding to the peripheral radius of curvature of each of the two scaffold tubes so as to be in close contact therewith over the entire length of said first arm, said second arm having an internal radius of curvature greater than the peripheral radius of curvature of said two tubes so as to be spaced therefrom by a progressively increasing distance in a direction along the length of the second arm towards the associated edge flange, said second arm at that edge of each of the holes therein which is furthest from the associated edge flange having the spring metal thereof formed with an integral projection extending inwardly beyond the adjacent part circular inner face of said second arm, each clamping bolt having a pressure applying portion embodying a peripheral edge in pressure engagement with the outer face of the second body arm at a position which is directly opposite to that of one of the projections on said second arm and each of said projections having a sharp edge in surface indenting engagement with the periphery of the adjacent scaffold tubes with the adjacent part circular inner face of said second arm spaced out of contact with each of said two tubes.

It is an essential characteristic of the present invention that the clamping pressure is applied locally by said second arm to each of the two scaffold tubes to be connected through each of the inwardly extending sharp edged projections. Insofar as the clamping pressure is applied locally by the clamping bolts to the second arm at positions corresponding to that of the sharp edge projections, as the clamping bolt is progressively tightened the sharp edged projections are brought into increasing surface indenting engagement with the adjacent convexedly curved surface of the scaffold tube so as to provide at each of these positions a particularly effective positive grip between the coupler and the adjacent tube.

Thus the clamping pressure exerted by the clamping bolts is applied directly to the scaffold tubes, i.e., is applied in the most efficient manner, namely through the adjacent sharp edged projections of the second arm of the coupler body, which by being formed in metal strip as opposed to being formed as a forging can readily be deformed locally.

Indeed, tests so far carried out indicate that for a given overall size of coupler formed of a particular spring steel strip and for a given tube diameter, the provision of the aforementioned sharp-edged projections substantially doubles the loading in tension which can be applied to two end-to-end connected scaffold tubes as compared with an otherwise identical coupler without one or the other of these tubes slipping out of the gripping engagement with the coupler.

Thus, the present invention insofar as the body of the coupler is formed in strip metal, as opposed to being made as a forging, is of a particularly inexpensive construction, while at the same time providing a coupler adapted to withstand without slip, tensile loadings of a kind which are encountered commonly in certain parts of a scaffold structure, for example, in diagonal or other bracing members.

The ability of the sharp edged projections on the second arm to have the above-mentioned positive indenting engagement with the two scaffold tubes is ensured by the further essential feature of this invention that the second arm of the coupler is designedly made to an internal radius of curvature which is greater than the peripheral radius of curvature of the cylindrical shaped scaffold tubes to be connected. Thus increasing indentation of the surface of the scaffold tubes by the sharp edged projections is not inhibited by the engagement of the adjacent convexedly curved surface of the second arm with the tube exterior.

A further essential feature of the invention is that the sharp edged projections are disposed at that edge of the clamping bolt openings in the second arm which is directly opposite to the opening edge which is nearest to the edge flange of the second arm. Such disposition of the sharp edged projections effectively ensures that the second arm of the coupler body is not distorted and thus made ineffective when the clamping bolts are fully tightened. If contrary to the foregoing disposition of the sharp edged projections the latter are disposed between the bolt openings of the second arm and the edge flange thereof, or are disposed on laterally opposite sides of the bolt openings in the second arm, i.e., between an opening and the lateral edge of the second arm, then in either such case distortion of the second arm can be expected when the bolts are tightened.

Advantageously the body is provided with a tube end locating pin extending between the arms of the C-shaped body at or adjacent their junction with the web and providing a stop for limiting the inward axial movement of the adjacent tube end within the body, at least one of the two arms of the body being slidable relative to the adjacent end of the pin in a direction along the length of the pin, with such end of the pin being provided with a head to limit the relative outward movement of the arms of the resilient body.

The locating pin may be welded or riveted in a fixed manner at one end thereof to two body arms, so as to be slidable to a limited extent relative to the other arm only, or if desired the pin may be slidable in a direction along the length of the pin through both arms to the extent necessary to provide for the resilient movement of the two arms towards and away from one another.

With either arrangement the locating pin performs the two functions of acting as a stop for limiting the inward axial movement of each tube relative to the body, thus ensuring that the two tubes are gripped over substantially the same length thereof by the body, i.e., are gripped in the most efficient manner possible, while at the same time the locating pin serves to prevent the two arms moving relatively apart when the clamping bolts are loosened by a distance greater than that sufficient to permit of easy insertion and removal of the tubes, whereby unnecessary screwing up of the clamping bolts is avoided when they are tightened to secure the tubes together.

BRIEF DESCRIPTION OF THE DRAWINGS

In order that the invention may be more clearly understood, reference is now made to the accompanying drawings wherein:

FIG. 1 is a side elevation of a scaffold tube coupler according to my prior unpublished proposal aforementioned, showing the form of the coupler when the bolts thereof have been tightened merely to the extent of bringing the two arms of the coupler body just into full surface engagement with the two end to end disposed scaffold tubes.

FIG. 2 is a sectional view on the line 2—2 of FIG. 1.

DESCRIPTION OF THE PREFERRED EMBODIMENT

Figure 3:
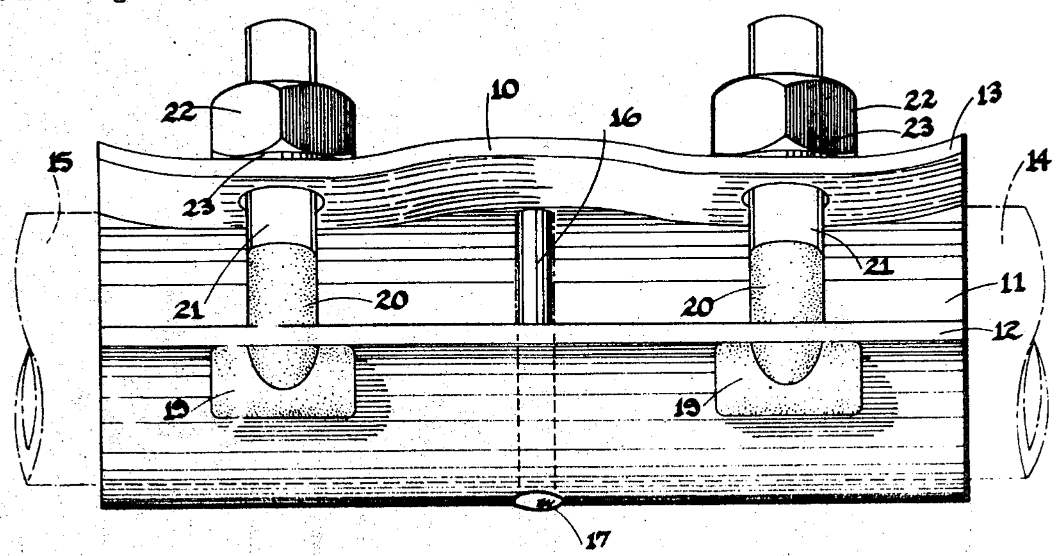
FIG. 3 is a view similar to FIG. 1 depicting the configuration of the same coupler when the bolts thereof have been fully tightened to the extent required to apply to the two arms the pressure necessary to secure the two scaffold tubes against separation under the tensile loading commonly encountered in bracing members of builders scaffolding.

In order that the importance and significance of my invention may be properly appreciated I refer firstly to my prior unpublished proposal depicted in FIGS. 1 to 3 of the accompanying drawings. The coupler there illustrated comprises a body 10 formed of medium carbon spring steel strip so as to be both resilient and deformable.

Such steel strip preferably has the following composition:

| Element: | Weight percent |
|---|---|
| Carbon | .35–.45 |
| Manganese | .6–1 |
| Silicon | .05–.35 |
| Phosphorus | .06 |
| Sulphur | .06 |
| Iron and commercial impurities the remainder. | |

Such spring steel strip is bent to substantially C configuration, so as to comprise a part-circular web 11, which merges into two integral first and second arms 12, 13, respectively, the two arms being each of part-circular configuration of the same curvature as that of the web. The radius of curvature of the inner concave face 11*a*, 12*a*, 13*a* respectively of the web and of both of the two arms is the same as the radius of curvature of the periphery of the two similarly cylindrical builder's scaffold tubes 14, 15, when these are connected in end-to-end relationship by the coupler with the web and arms in embracing engagement with the two tubes as shown in FIGS. 1 and 2.

Medially of the length of the coupler body 10 this is provided with a locating pin 16 which extends perpendicularly transverse to the axis of curvature of the web 11, through the body at the junction between each arm 12, 13 and the adjacent web.

Each end of the pin 16 extends through a hole in the adjacent body part, in each of which holes the pin end is freely slidable in a direction along the length of the pin, with each end of the pin being formed with a head 17 for limiting the outward apart movement of the two resilient arms 12, 13.

Each part-circular arm 12, 13, terminates in an edge flange 12*b*, 13*b*, respectively, which forms a part of its associated arm, with each edge flange bent outwardly away from the adjacent part-circular portion of the arm so that the two edge flanges diverge relatively, with the outward inclination of the edge flange 12*b* of first arm 12 being greater than in the case of edge flange 13*b* of second arm 13 so as at the junction between edge flange 12*b* and the part-circular portion of first arm 12 to provide a wide substantially V-shaped recess 18 extending parallel to the axis of curvature of the C-shaped body 10.

Within the recess 18 works each of the heads 19 of a pair of T headed clamping bolts 20. The two bolts are spaced apart along the axis of the aligned tubes 14, 15 so as each to apply clamping pressure to one tube. The shanks 21 of the bolts are screw threaded at their outer ends where they carry clamping nuts 22, and these shanks extend through holes 12*c*, 13*c*, respectively provided in the two edge flanges 12*b*, 13*b* adjacent their junction with the part-circular portions of their respective arms. The holes 12*c*. 13*c* are elongated in a direction perpendicular to the axis of curvature of the web 11 so as to have a diameter greater than the diameter of the bolt shank 21, by an amount sufficient as to permit of each bolt 20 rocking by its T-shaped head 19 within the aforementioned V-shaped recess 18 about an axis parallel to the length of the axis of curvature of web 11, when the clamping bolts are tightened.

Each clamping bolt 20 is provided with a pressure applying portion in the form of a washer 23 disposed on the underside of the adjacent nut 22 which as shown in FIG. 2 is over its entire inner face in face-to-face engagement with the outer face of the edge flange 13*b* of second arm 13, so as to be adapted to apply pressure thereto when the two nuts 22 are tightened to apply clamping pressure to the end-to-end disposed scaffold tubes.

I have carried out tests with a coupler as above described made by me in accordance with the foregoing unpublished prior proposal of myself, such coupler was formed of medium carbon spring steel strip of the composition above specified, with the two scaffold tubes 14, 15 being made in mild steel so as to have a lower carbon content and thus a lesser surface hardness to the metal than in the case of the medium carbon steel forming the coupler. The relevant dimensional data of such so tested coupler and scaffold tubes was:

Peripheral radius of curvature of each scaffold tube 15/16 in.

Wall thickness of each scaffold tube 5/32 in.

Thickness of the metal strip forming the coupler body 5/32 in.

Overall width of such metal strip as ensured in a direction parallel to the length of the scaffold tubes 6 in.

Radius of curvature of the inner concave face of each arm 12, 13, 15/16 in.

Minimum distance, i.e., distance D1 in FIG. 2 between the two edge flanges **12*b*, 13*b* before applying clamping torque to nuts 22**, i.e., with the parts in the position shown in FIG. 1 and in full outline in FIG. 2, 1-7/32 in.

With the coupler having the data above-described and positioned on the above-described scaffold tubes as shown in FIGS. 1 and 2 the clamping bolt nuts 22 were now tightened by applying thereto a steadily increasing torque loading up to a maximum value for each nut of 29 foot lbs. At this clamping bolt torque the two scaffold tubes were subjected to a steadily increasing axial loading acting in a direction to pull the two tubes relatively apart and at an axial loading as low as 12.5 cwts., the two tubes 14, 15 moved relatively apart, i.e., there was slip between at least one tube and the coupler body in the direction of the length of the tube.

At this torque loading of the two nuts 22, the second arm 13 in the vicinity of the edge flange bolt holes **13*c* was permanently distorted in the manner depicted in FIG. 3 and in dashed outline in FIG. 2 so that the minimum distance D1 between the two edge flanges 12*b*, 13*b* was here locally decreased from its initial value of 1-7/32 in. to 1-3/32 in. corresponding to a distortion of the edge flange 13*b*** through a distance of 1/8 in. Such permanent distortion of the coupler necessarily renders the coupler useless.

I can summarise the foregoing by saying that a coupler according to my prior proposal above mentioned is quite useless in providing a significant tensile loading resistant connection between the two end-to-end scaffold tubes. A slip value at 12.5 cwt. for the above-described tube size is unacceptable in the building industry especially if accompanied by permanent distortion of the coupler body as above specified.

Reference is now made to FIGS. 4 to 7 of the accompanying drawings in which is depicted one form of coupler in accordance with my invention for securing two scaffold tubes in end-to-end relationship.

The construction of such coupler in the main is the same as that of my prior proposal depicted in FIGS. 1 to 3 and already fully described in relation to those figures, but with two most important additions now to be explained.

Firstly, during the formation of each bolt receiving hole **13*c* in the second arm 13 the metal of the second arm 13 at the edge of the hole 13*c* which is furthest from edge flange 13*b*, i.e., nearest to the web 11, i.e., at a position between the web and the clamping bolt, is on the inner face of such arm deformed inwardly of the arm 13, to form a sharp edged projection 24, the sharp edge 24*a* of which extends inwardly of the second arm beyond its adjacent concavedly curved inner surface 13*a***.

Since each projection 24 is formed integrally with the metal of the second arm, i.e., in medium carbon spring steel strip, it has a surface hardness greater than the surface hardness of the metal, i.e., mild steel, forming the scaffold tubes 14, 15. Such difference in surface hardness is increased by the work hardening of the metal which occurs in the formation of the projections 24. Thus the sharp edge **24*a* of each projection 24** is inherently adapted for surface indenting engagement with the periphery of the adjacent scaffold tube.

Such surface indenting of the periphery of each scaffold tube with the clamping nuts 22 fully tightened is ensured by the second important addition to my above prior proposal provided by my invention namely that the second arm 13 has an internal radius of curvature greater than the peripheral radius of curvature of the two cylindrical shaped scaffold tubes 14, 15. The difference between the two radii of curvature may be quite small. Thus for a peripheral tube radius above-mentioned of 15/16 in. with each projection 24 extending by an overall radial distance of 3/64 in. above the second arm surface **13*a***, the latter would have a radius of curvature of 1 in.

Figure 5:
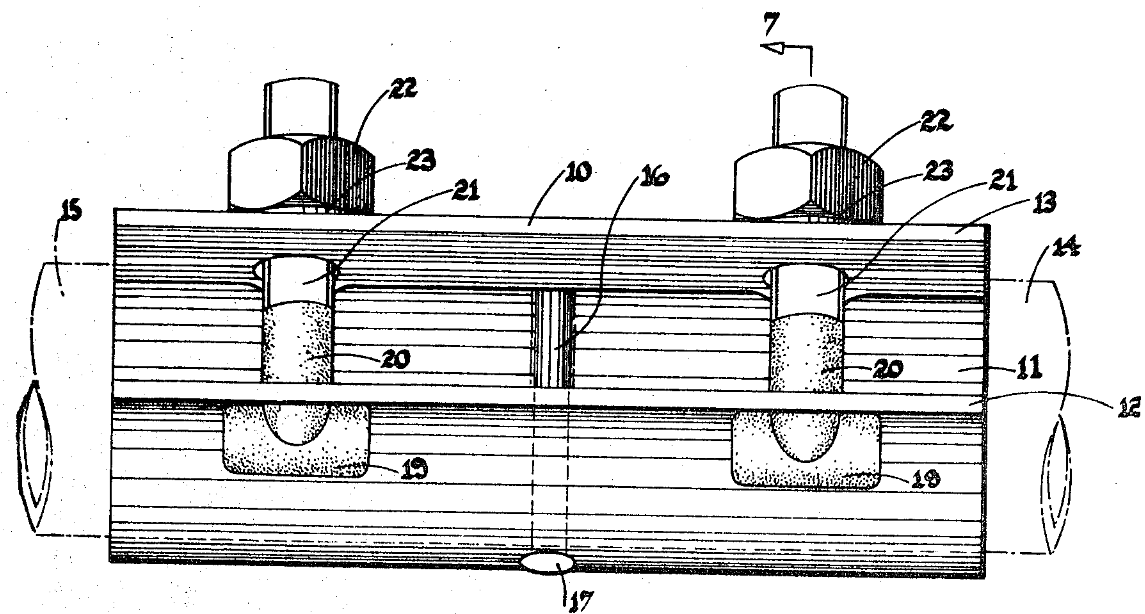
Figure 6:
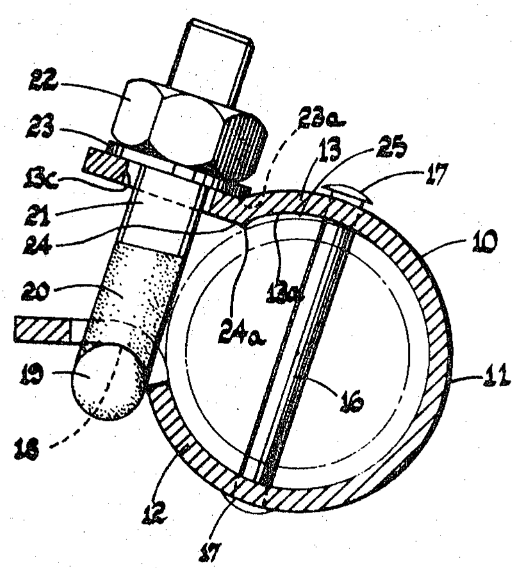
FIGS. 6 and 7 are sectional views on the lines 6—6 and 7—7 respectively of FIGS. 4 and 5.
Figure 7:
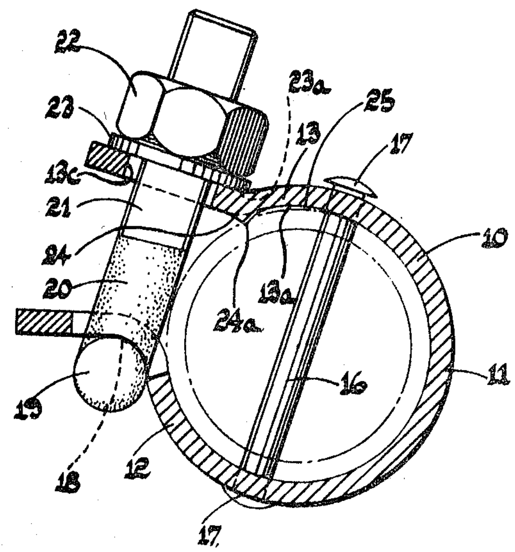

The effect of the foregoing is to provide as shown in FIGS. 6 and 7 a clearance space 25 adjacent each projection 24 between the second arm inner concave face **13*a* and the adjacent surface of the scaffold tube. Thus as each clamping nut 22 is tightened from the initial contact position of FIGS. 4 and 6 to the fully tight position depicted in FIGS. 5 and 7, the sharp edges 24*a* of the projections 24 are not prevented from indenting engagement with the peripheral surface of the scaffold tubes by the adjacent inner face 13*a* of the second arm 13 being already in full contact with the scaffold tubes. Instead when the sharp edges 24*a* of the projections 24 are in fully pressure indenting engagement with the exterior surface of the scaffold tubes with the nuts 22 fully tightened, the clearance space 25** still exists as clearly shown in FIG. 7 though reduced in depth as compared with that depicted in FIG. 6.

Thus the degree of surface indenting of the scaffold tubes by the projections 24 is limited only by the difference in surface hardness and the maximum torque loading applied to the nuts 22.

As will be observed from FIGS. 6 and 7 the pressure applying portion of each clamping bolt namely washer 23 embodies a peripheral edge **23*a* which is in pressure engagement with the outer face of the second arm 13 at a position which is directly opposite to the position of the adjacent projection 24**.

The arrangement ensures that the maximum possible local pressure is applied by the nuts 22 to each deformation 24 to effect maximum indenting of the surface method of the scaffold tubes.

Insofar as with the present invention there is surface indenting of the scaffold tubes when the nuts 22 are fully tightened, a positive interlock as opposed merely to friction pressure engagement is provided between the coupler and the two scaffold tubes 14, 15. At the same time insofar as the clamping pressure is applied to the second arm 13 at positions on the outer face thereof which are directly opposite to that of the projections 24, the metal of the second arm 13 is not subjected to a bending movement tending to distort it in the vicinity of the projections 24. On the contrary, where the clamping nuts 22 apply the maximum loading to the second arm, i.e., adjacent the edges **23*a* of washers 23, the loading of the second arm from washer edges 23*a* to the projections 24** is essentially a direct simple compressive loading.

The foregoing is well illustrated by a further test carried out with a pair of scaffold tubes the same as those employed in the first test earlier described, with a coupler formed of steel strip of composition and made of manufacture and treatment identical with that of the strip forming the coupler of the first test, with the coupler having the dimensions the same as that of the first test of my prior proposal except for the increased radius of curvature of arm face **13*b*** and the provision of the projections 24 to the depth above specified as depicted in FIGS. 4 to 7.

Figure 4:
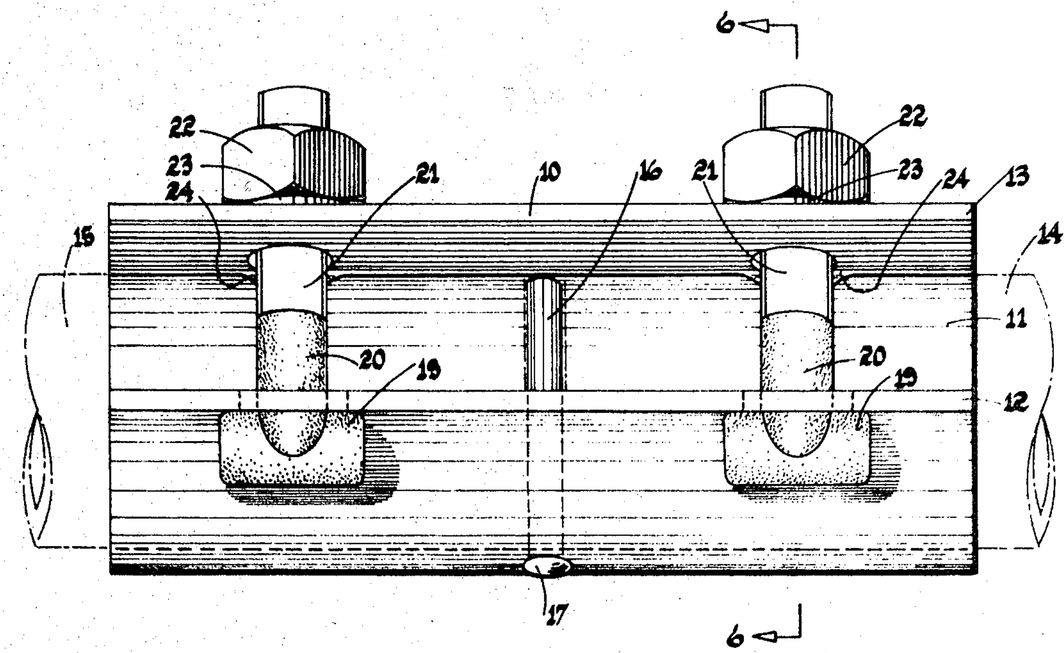
FIGS. 4 and 5 are side elevations corresponding to FIGS. 1 and 3 respectively but depicting one form of scaffold tube coupler in accordance with this invention.

This further test was performed in manner identical with the first test earlier described namely by applying the same maximum torque loading of 29 foot lbs. to each of the two nuts 22 thus bringing the coupler from the initial just engaging position of FIGS. 4 and 6 to the fully tight position of FIGS. 5 and 7. At this torque loading of the nut 22, there was no measurable distortion of the second arm 13 or of my part of the coupler which had the configuration depicted in FIGS. 5 and 7 as opposed to the permanently deformed shape of FIG. 3 so as to be still fully useable. At the same time the tensile loading of the two tubes 14, 15 at which slip commenced relative to the coupler was now 1 ton as opposed to 12.5 cwt. indicating an increase in the efficiency of the coupler of well above 50% which is a substantial increase.

With a coupler according to this invention, it will be understood that when the clamping nuts 22 are loosened the two arms 12, 13 at once move relatively apart under the resilience of the spring metal forming the body 10, such relative apart movement being limited by the locating pin 16, for the reason already explained.

Each clamping bolt 20 is disposed substantially medially in an axial sense between the transverse plane containing the locating pin 16 and the adjacent end of the body, so that with the tube ends each in abutment with the locating pin 16, each clamping bolt 20 applies its clamping pressure at a position which is symmetrical in an axial sense relative to that part of the end of each scaffold tube which is to be connected together.

I claim:

1. In builders scaffolding, means connecting two similarly cylindrical shaped metal scaffold tubes in end-to-end relationship comprising a coupler embodying a body formed of spring steel strip of surface hardness greater than the surface hardness of the metal forming the two scaffold tubes, said body comprising a part circular substantially C-shaped portion embodying first and second arms each of part circular shape on the inner face thereof, said arms each terminating in relatively diverging edge flanges, a pair of clamping bolts spaced relatively apart in a direction along the axis of curvature of the C-shaped body and extending each through a pair of holes formed in the arms at the junction between each of the two arms and their respective edge flanges, said first arm having an internal radius of curvature corresponding to the peripheral radius of curvature of each of the two scaffold tubes so as to be in close contact therewith over the entire length of said first arm, said second arm having an internal radius of curvature greater than the peripheral radius of curvature of said two tubes so as to be spaced therefrom by a progressively increasing distance in a direction along the length of the second arm towards the associated edge flange, said second arm at that edge of each of the holes therein which is furthest from the associated edge flange having the spring metal thereof formed with an integral projection extending inwardly beyond the adjacent part circular inner face of said second arm and each clamping bolt having a pressure applying portion embodying a peripheral edge in pressure engagement with the outer face of the second arm at a position which is directly opposite to that of one of the projections on said second arm, and each of said projections having a sharp edge in surface indenting engagement with the periphery of the adjacent scaffold tubes with the adjacent part circular inner face of said second arm spaced out of contact with each of said two tubes.

2. A coupler according to claim 1 wherein the body is provided with a tube end locating pin extending between the arms of the C-shaped body at or adjacent their junction with the web and providing a stop for limiting the inward axial movement of the adjacent tube end within the body, at least one of the two arms of the body being slidable relative to the adjacent end of the pin in a direction along the length of the pin, with such end of the pin being provided with a head to limit the relative outward movement of the arms of the resilient body.

3. A coupler according to claim 1, wherein the clamping bolts comprise T headed bolts, with each head accommodated in a recess or groove formed by bending one of the two body arms to substantially wide V configuration, with the length of the V extending parallel to the axis of curvature, with the shank of each clamping bolt extending through holes in the body arms, which holes are of a diameter, in a direction transverse to the axis of curvature of the part-circular web, which is larger than the shank diameter, so as to permit of a limited hinging movement of the bolts as these are tightened.

References Cited

UNITED STATES PATENTS

| | | | |
|---|---|---|---|
| 933,386 | 9/1909 | Neill | 287—189.36C |
| 1,433,381 | 10/1922 | Kirkpatrick | 287—110 |
| 1,795,032 | 3/1931 | McEwen | 287—189.36C |
| 1,797,904 | 3/1931 | Dibner | 287—110 |
| 1,806,312 | 5/1931 | Schiller | 287—189.36CX |
| 2,643,902 | 6/1953 | Stanworth | 287—118X |

FOREIGN PATENTS

| | | | |
|---|---|---|---|
| 16,337 | Ad. 1886 | Great Britain | 287—118 |
| 810,620 | 3/1959 | Great Britain | 287—189.36C |

DAVID J. WILLIAMOWSKY, Primary Examiner

W. L. SHEDD, Assistant Examiner

U.S. Cl. X.R.

287—110, 111